United States Patent
Farrell et al.

(10) Patent No.: US 8,973,743 B2
(45) Date of Patent: Mar. 10, 2015

(54) WOVEN WIRE CONVEYOR BELT AND A METHOD OF FORMING THE SAME

(71) Applicant: Lumsden Corporation, Lancaster, PA (US)

(72) Inventors: Glenn Farrell, Lancaster, PA (US); Gina Mitchell, Columbia, PA (US); Boyd E. Knepp, Lancaster, PA (US)

(73) Assignee: Lumsden Corporation, Lancaster, PA (US)

( * ) Notice: Subject to any disclaimer, the term of this patent is extended or adjusted under 35 U.S.C. 154(b) by 139 days.

(21) Appl. No.: 13/849,039

(22) Filed: Mar. 22, 2013

(65) Prior Publication Data

US 2014/0284185 A1    Sep. 25, 2014

(51) Int. Cl.
| | | |
|---|---|---|
| *B65G 15/48* | (2006.01) | |
| *B65G 15/42* | (2006.01) | |
| *B65G 17/06* | (2006.01) | |
| *B65G 15/54* | (2006.01) | |

(52) U.S. Cl.
CPC ..................................... *B65G 15/54* (2013.01)
USPC ............ 198/848; 198/851; 198/852; 198/853

(58) Field of Classification Search
None
See application file for complete search history.

(56) References Cited

U.S. PATENT DOCUMENTS

| | | | |
|---|---|---|---|
| 2,885,164 A * | 5/1959 | Hooper | ............................. 245/6 |
| 7,278,534 B2 | 10/2007 | Record | |
| 7,581,569 B2 | 9/2009 | Beck et al. | |
| 7,815,053 B2 | 10/2010 | Knepp | |
| 8,919,568 B2 | 12/2014 | Beck et al. | |
| 2013/0068668 A1 | 3/2013 | Beck et al. | |

* cited by examiner

*Primary Examiner* — Kavel Singh
(74) *Attorney, Agent, or Firm* — Merek, Blackmon & Voorhees, LLC

(57) ABSTRACT

A woven wire conveyor belt having a plurality of spiral wires and a plurality of connecting wires operably associated with the plurality of spiral wires to form a conveying surface with a plurality of openings formed therein. Each of the plurality of spiral wires has a first side wall and a second side wall that are substantially flat. The connecting wires can be crimped or straight wires. The spiral wires can be left spiral wires, right spiral wires or a combination of left and right spiral wires. The spiral wires and the connecting wires are preferably formed from round wire. Preferably, the woven wire conveyor belt is an endless belt. The conveyor belt can be a balanced weave wire belt, a double weave wire belt, a rod reinforced weave wire belt, a chevron weave wire belt, a double balance weave wire belt, and a single weave wire belt.

22 Claims, 2 Drawing Sheets

WOVEN WIRE CONVEYOR BELT AND A METHOD OF FORMING THE SAME

FIELD OF THE INVENTION

The field of the present invention is directed to a woven wire conveyor belt including a plurality of spiral wires and a plurality of connecting wires operably associated with the plurality of spiral wires to form a conveying surface having a plurality of openings. Preferably, the conveyor belt is an endless conveyor belt.

BACKGROUND OF THE INVENTION

Spiral wire conveyor belts (i.e., belts where one of the wires is a spiral wire) have been used to facilitate the "Conveyorizing" of numerous processes which otherwise would have to be done by batch or non-continuous methods. Spiral wire conveyor belts include balanced weave wire belts, double weave wire belts, rod reinforced weave wire belts, chevron weave wire belts, double balance weave wire belts, and single weave wire belts. The major function of these previously known conveyor belts is to allow the conveyed product to be treated in some manner as the belt moves the conveyed product from one location to another location.

Conventional spiral wire belts place a premium on the conveying surface formed by the spiral wire conveyor belt. For example, several forms of spiral wire belts are formed to maximize the aggregate surface area of the conveying surface of the belt which necessarily minimizes the size of the openings. This is readily evident when comparing a balance weave belt with a double weave belt. The double weave belt has significantly greater aggregate surface area of the conveying surface of the belt and considerably smaller openings than the balance weave belt. To improve the conveying surface of the balance weave belt, it has been known to flatten the top and bottom walls of the spiral wires. The flattening of the top wall and bottom wall of the spiral wires of the balance weave belt accomplishes two objectives, i.e., it increases the aggregate surface area of the conveying surface and provides a flat conveying surface more suitable for conveying some products. This flattening of the top wall and bottom wall of the spiral wires of the balance weave belt also decreases the opening size which is consistent with conventional thinking employed in the design of spiral wire belts.

The aforementioned previously known wire weave conveyor belts have several inherent limitations which include but are not limited to strength and opening size.

The preferred form of the present invention is directed at overcoming both of these limitations by utilizing a design of spiral wire belt that swims upstream or directly against conventional thinking. Specifically, the preferred form of the present invention significantly increases opening size of the openings formed in the conveying surface which necessarily decreases aggregate conveying surface area contrary to conventional spiral wire belt design. The process of the present invention by which the opening sizes are increased acts to significantly increase the strength of the wire weave conveyor belt without changing the size or cross-sectional area of any of the wires forming the spiral wire weave conveyor belt. The increase in the size of the openings formed in the conveying surface of a preferred form of the present invention occurs without changing the size or cross-sectional area of any of the wires forming the wire weave conveyor belt. The advantages obtained by the preferred form of the present invention further allow a conveyor belt to be formed from a smaller diameter wire while maintaining the strength of a conventional wire weave conveyor belt formed from a larger diameter wire. The preferred form of the present invention further allows for the use of larger size wires while still maintaining the same opening size of conveyor belts formed from smaller wires. By using a larger diameter wire while maintaining the opening size normally achieved with a smaller wire, the strength of the belt is significantly increased without affecting the size of the openings formed in the conveyor belt.

OBJECTS AND SUMMARY OF THE INVENTION

An object of the present invention is to provide a novel and unobvious woven wire conveyor belt and method of forming the same.

Another object of a preferred embodiment of the present invention is to provide a woven wire conveyor belt that significantly increases opening size of the openings formed in the conveying surface without changing the size or cross-sectional area of any of the wires forming the wire weave conveyor belt.

A further object of a preferred embodiment of the present invention is to provide a woven wire conveyor belt that uses larger size wires while still maintaining the same opening size of conveyor belts formed from smaller wires.

Yet another object of a preferred embodiment of the present invention is to provide a woven wire conveyor belt having a plurality of spiral wires where each spiral wire is formed from a round wire to have substantially flat or planar left and right sidewalls to significantly increase the strength of the conveyor belt and the size of the openings without changing the size or cross-sectional area of the round wire used to form the conveyor belt.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, a preferred embodiment of the present invention is directed to a woven wire belt for conveying one or more articles from a first location to a second location spaced from the first location. The woven wire belt includes a plurality of spiral wires and a plurality of connecting wires for connecting the plurality of spiral wires to form a woven wire belt having a conveying surface. Each of the plurality of connecting wires extends substantially perpendicular to a direction of travel of the woven wire belt. Each of the plurality of spiral wires having a plurality of upper wire segments and a plurality of lower wire segments. The plurality of upper wire segments are spaced from the plurality of lower wire segments. Each of the plurality of upper wire segments are angled in a first direction. Each of the plurality of lower wire segments are angled in a second direction wherein the second direction is different from the first direction. Each of the plurality of spiral wires has a first sidewall portion and a second sidewall portion. The first sidewall portion and the second sidewall portion extend substantially perpendicular to the conveying surface of the woven wire belt. The first sidewall portion and the second sidewall portion are substantially flat. The first sidewall portion is connected to the second sidewall portion by an arcuate upper portion and an arcuate lower portion.

Another preferred embodiment of the present invention is directed to a woven wire belt for conveying one or more articles from a first location to a second location spaced from the first location. The woven wire belt includes a plurality of spiral wires and a plurality of connecting wires for connecting the plurality of spiral wires to form a woven wire belt having a substantially horizontally extending conveying surface. The conveying surface has a plurality of openings. Each of the plurality of spiral wires has a first sidewall portion and a second sidewall portion. The first sidewall portion and the second sidewall portion extend substantially perpendicular to the conveying surface of the woven wire belt. The first sidewall portion and the second sidewall portion are substantially flat.

A further preferred embodiment of the present invention is directed to a woven wire belt for conveying one or more articles from a first location to a second location spaced from the first location. The conveyor belt includes a plurality of spiral wires. Each of the plurality of spiral wires has a first sidewall portion and a second sidewall portion. The first sidewall portion and the second sidewall portion are substantially flat. The first sidewall portion is connected to the second sidewall portion by at least one of an arcuate upper portion and an arcuate lower portion. The conveyor belt further includes a plurality of connecting wires for connecting the plurality of spiral wires to form a woven wire belt having a substantially horizontally extending conveying surface. The conveying surface has a plurality of openings. Each of the plurality of connecting wires is fixed to each of the plurality of spiral wires forming a plurality of interconnected spiral wire belt segments. Each of the plurality of spiral wire belt segments have a plurality of openings.

DETAILED DESCRIPTION OF THE PREFERRED EMBODIMENTS OF THE INVENTION

The preferred forms of the invention will now be described with reference to FIGS. 1 and 2. The appended claims are not limited to the preferred forms and no term and/or phrase used herein is to be given a meaning other than its ordinary meaning unless it is expressly stated that the term and/or phrase shall have a special meaning FIGS. 1 and 2

Figure 1:
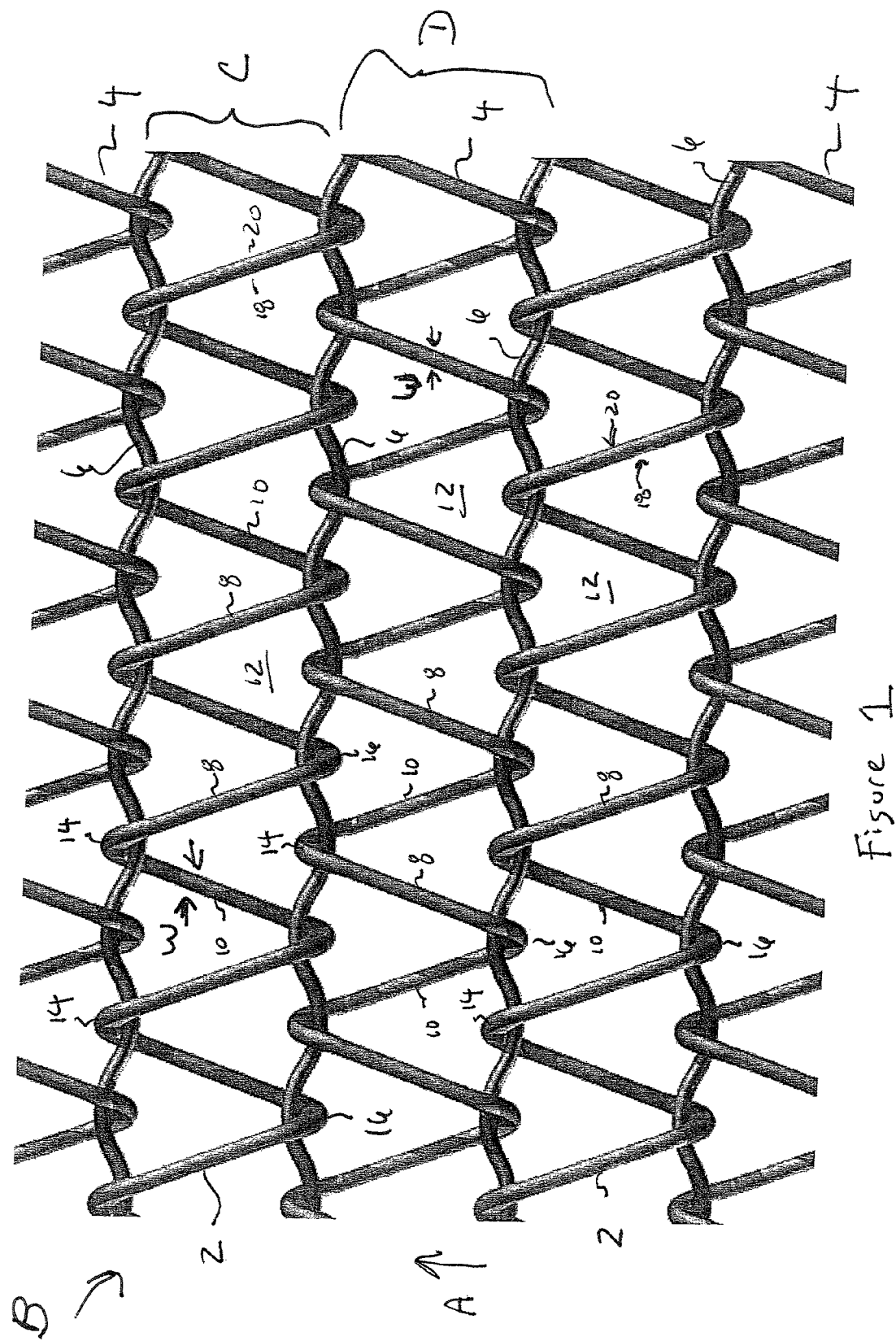
FIG. 1 is a plan view of a portion of an endless conveyor belt formed in accordance with a preferred embodiment of the present invention.
Figure 2:
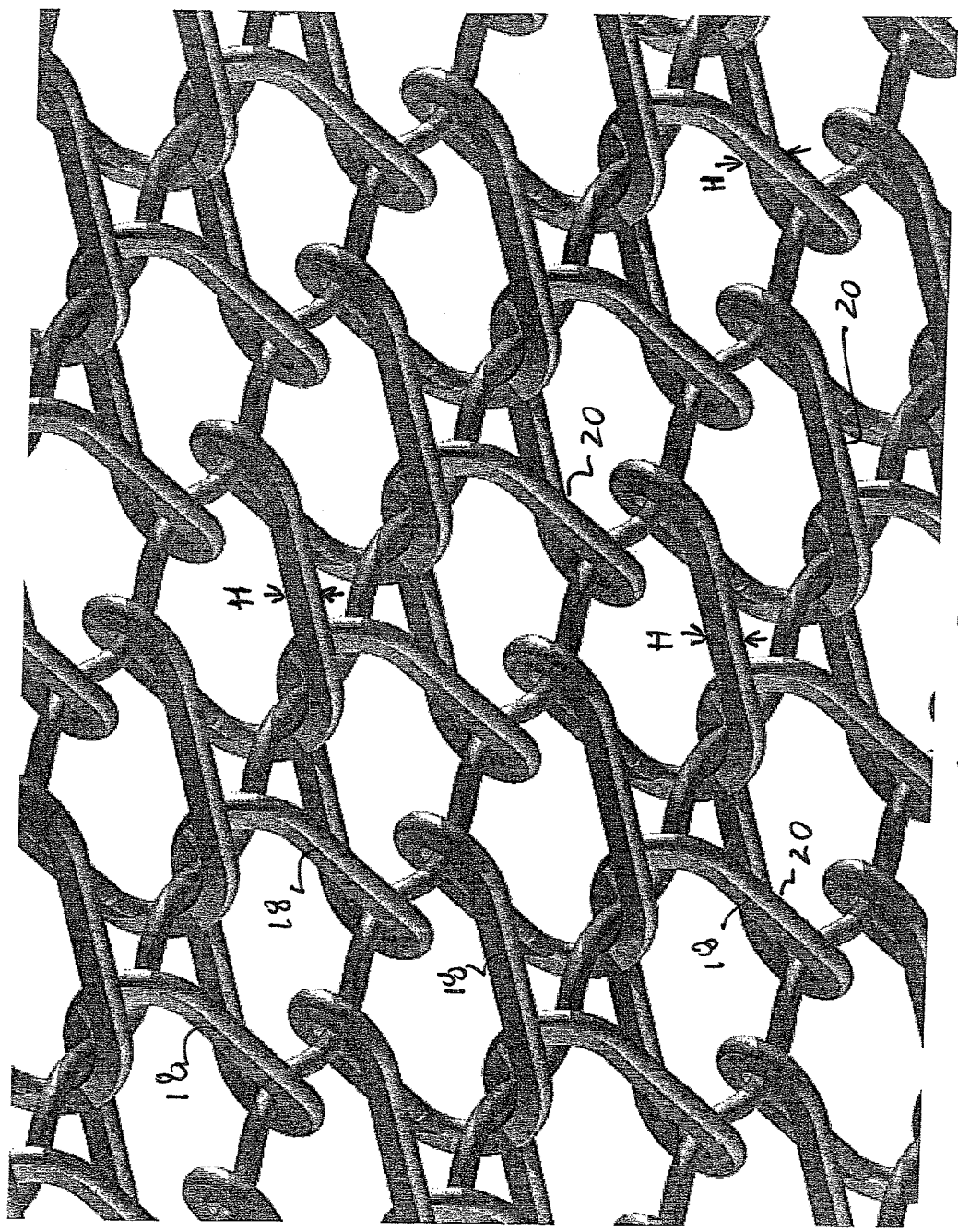
FIG. 2 is a perspective view of a portion of an endless conveyor belt formed in accordance with a preferred embodiment of the present invention.

FIGS. 1 and 2 illustrate a representative portion of a balance weave wire conveyor belt B formed in accordance with a preferred embodiment of the present invention. Referring to FIG. 1, arrow A indicates the direction of travel of the endless conveyor belt. While the preferred form is shown as a balance weave wire conveyor belt, it will be readily appreciated that the present invention can be readily employed in other endless conveyor belts including but not limited to a double weave wire belt, a rod reinforced weave wire belt, a chevron weave wire belt, a double balance weave wire belt and a single weave wire belt.

The endless conveyor belt B (only a representative portion is shown) includes a plurality of right spiral wires 2, a plurality of left spiral wires 4, and a plurality of connecting wires 6. Each of the plurality of right spiral wires 2 and left spiral wires 4 have a plurality of upper portions 8 and a plurality of lower portions 10. The plurality of upper portions 8 are spaced from the plurality of lower portions and form a substantially horizontally extending conveying surface having a plurality of openings 12. Openings 12 allow the product being conveyed from one location to another to be treated while being conveyed.

The distance between the upper portions 8 forming the conveying surface and the lower portions 10 of each of the spiral wires is determined by the thickness of the blade of the spiral/helix machine used to form the spiral wires. Preferably, the spacing between the upper portions 8 and lower portions 10 of the left and right spiral wires is uniform. The width of the blade determines the distance between the peaks 14 and valleys 16 of the left and right spiral wires. Preferably, the distance between the peaks 14 and valleys 16 of the left and right spiral wires is uniform. The distance between adjacent peaks 14 of any given spiral wire is determined by two worms of the spiral/helix machine used to form the spiral wires. Again, the distance between peaks 14 of each of the left and right spiral wires is preferably uniform.

In the preferred method of forming an endless conveyor belt pursuant to the present invention, round wire is feed through at least one pair of oppositely disposed flattening rollers prior to being manipulated by the blade and corresponding worms of the spiral/helix machine used to form the spiral wires. The rollers form a first substantially flat or planar sidewall 18 and a second substantially flat or planar sidewall 20 on each of the left and right spiral wires, as best seen in FIG. 2. This creates a substantially oblong cross-section with two flat side walls as opposed to a round cross-section. While the shape of the cross-section changes, the area of the cross-section remains constant.

The width W of the wire after passing through the oppositely disposed rollers is less than the diameter of round wire used to form each of the left and right spiral wires. The height H of the wire after passing through the oppositely disposed rollers is greater than the diameter of round wire used to form each of the left and right spiral wires. There are at least two significant advantages to forming the left and right spiral wires as just described. First, the opening size 12 is significantly increased without changing the size or cross-sectional area of the wire used to form each of the left and right spiral wires. Second, the strength of each of the left and right spiral wires is significantly increased without changing the size or cross-sectional area of the wire used to form the left and right spiral wires. Preferably, the section of forming wire processed by the oppositely disposed rollers is fed directly to the blade and worms of the spiral/helix machine where further processing will form either a left spiral wire or a right spiral wire depending upon how the spiral/helix machine is set up, i.e., whether it is set up to form right spiral wires or left spiral wires.

It be readily appreciated that the left and right spiral wires formed as described above will have an arcuate top surface and an arcuate bottom surface. If it is desired to form the left and right spiral wires with a flat or planar top and bottom surface, the forming wire can be fed through a second pair of oppositely disposed rollers rotated 90 degrees from the first pair of oppositely disposed rollers used to form the flat or planar sidewalls of the left and right spiral wires. The second pair of oppositely disposed rollers could be located upstream or downstream of the first pair of oppositely disposed rollers used to form the flat or planar sidewalls. The flat top and bottom surfaces would be formed in the wire prior to processing by the blade and corresponding worms.

Once the left and right spiral wires are formed, connecting wires 6 are used to connect a left spiral belt segment to a directly adjacent right spiral belt segment. For example, right spiral belt segment C includes a connecting wire 6 connected to opposite ends of the right spiral wire 2 such that the left spiral wire 4 of left spiral wire belt segment D is interlocked with the right spiral wire belt segment C forming an endless conveyor belt with interconnected and alternating left and right wire belt segments along the entirety or substantially the entirety of the belt. Any suitable means can be used to secure the connecting wires 6 to the opposite ends of the corresponding spiral wire including but not limited to welding, brazing and knuckling.

In the embodiment illustrated in FIGS. 1 and 2, the connecting wires 6 are crimped. However, it will be readily appreciated that connecting wires can take other forms including a straight wire form. Preferably, the connecting wires 6 in a given belt have a uniform construction.

The spiral wires and connecting wires may be formed from any suitable material including but not limited to metals and alloys ranging from plain low carbon steel to the highly alloyed nickel-chromium alloys.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A woven wire belt for conveying one or more articles from a first location to a second location spaced from the first location; said woven wire belt comprising:
   (a) a plurality of spiral wires;
   (b) a plurality of connecting wires for connecting the plurality of spiral wires to form a woven wire belt having a conveying surface, each of said plurality of connecting wires extending substantially perpendicular to a direction of travel of the woven wire belt;
   (c) each of said plurality of spiral wires having a plurality of upper wire segments and a plurality of lower wire segments, said plurality of upper wire segments are spaced from said plurality of lower wire segments, each of said plurality of upper wire segments are angled in a first direction, each of said plurality of lower wire segments are angled in a second direction wherein the second direction is different from the first direction; and,
   (d) each of said plurality of spiral wires having a first sidewall portion and a second sidewall portion, said first sidewall portion and said second sidewall portion extending substantially perpendicular to said conveying surface of the woven wire belt, said first sidewall portion and said second sidewall portion being substantially flat, each of said plurality of spiral wires having a height and a width, said height extending substantially perpendicular to said conveying surface and said width extending substantially parallel to said conveying surface, said height being greater than said width.

2. A woven wire belt as set forth in claim 1, wherein:
   (a) said woven wire belt is a balanced weave woven wire belt having a plurality of left spiral wires, a plurality of right spiral wires and a plurality of crimp wires, each of said plurality of left spiral wires having a first sidewall portion and a second sidewall portion, said first sidewall portion and said second sidewall portion of each of said plurality of left spiral wires extending substantially perpendicular to said conveying surface of the woven wire belt, said first sidewall portion and said second sidewall portion of each of said plurality of left spiral wires being substantially flat, said first sidewall portion being connected to said second sidewall portion of each of said plurality of left spiral wire by an arcuate upper portion and an arcuate lower portion, each of said plurality of right spiral wires having a first sidewall portion and a second sidewall portion, said first sidewall portion and said second sidewall portion of each of said plurality of right spiral wires extending substantially perpendicular to said conveying surface of the woven wire belt, said first sidewall portion and said second sidewall portion of each of said plurality of right spiral wires being substantially flat, said first sidewall portion being connected to said second sidewall portion of each of said plurality of right spiral wires by an arcuate upper portion and an arcuate lower portion.

3. A woven wire belt as set forth in claim 1, wherein:
   (a) each of said plurality of connecting wires is a crimped wire.

4. A woven wire belt as set forth in claim 1, wherein:
   (a) each of said plurality of connecting wires is a straight wire.

5. A woven wire belt as set forth in claim 1, wherein:
   (a) said woven wire belt includes a plurality of upper openings have a substantially uniform size and shape and a plurality of lower openings having a substantially uniform size and shape.

6. A woven wire belt as set forth in claim 1, wherein:
   (a) each of said plurality of spiral wires are connected to a corresponding connecting wire by one of the following processes: (i) welding; (ii) brazing; and (iii) knuckling.

7. A woven wire belt for conveying one or more articles from a first location to a second location spaced from the first location; said woven wire belt comprising:
   (a) a plurality of spiral wires;
   (b) a plurality of connecting wires for connecting the plurality of spiral wires to form a woven wire belt having a substantially horizontally extending conveying surface, said conveying surface having a plurality of openings; and
   (c) each of said plurality of spiral wires having a first sidewall portion and a second sidewall portion, said first sidewall portion and said second sidewall portion extending substantially perpendicular to said conveying surface of the woven wire belt, said first sidewall portion and said second sidewall portion being substantially flat.

8. A woven wire belt as set forth in claim 7, wherein:
   (a) said woven wire belt is one of the following: (i) balanced weave wire belt; (ii) a double weave wire belt; (iii) a rod reinforced weave wire belt; (iv) a chevron weave wire belt; (v) a double balance weave wire belt; and, (vi) a single weave wire belt.

9. A woven wire belt as set forth in claim 7, wherein:
   (a) each of said plurality of spiral wires has a height and a width, said height extends substantially perpendicular to said conveying surface and said width extends substantially parallel to said conveying surface, said height is greater than said width, said plurality of spiral wires includes a plurality of left spiral wires and a plurality of right spiral wires.

10. A woven wire belt as set forth in claim 9, wherein:
    (a) each of said plurality of connecting wires is a crimped wire.

11. A woven wire belt as set forth in claim 10, wherein:
    (a) a crimped wire is fixed to each of said plurality of left spiral wires forming a plurality of left spiral wire belt segments;

(b) a crimped wire is fixed to each of said plurality of right spiral wires forming a plurality of right spiral wire belt segments; and, (c) said plurality of left wire belt segments and said plurality of right spiral wire belts segments are alternately arranged along the length of said woven wire belt such that at least one section of the woven wire belt includes a first left spiral wire belt segment interlocked to a first right spiral wire belt segment at a forward portion of said first right spiral wire belt segment and a second left spiral wire belt segment interlocked to said first right spiral wire belt segment at a trailing portion of said first right spiral wire belt segment.

12. A woven wire belt set forth in claim 11, wherein:

(a) said woven wire belt includes a plurality of upper openings have a substantially uniform size and shape and a plurality of lower openings having a substantially uniform size and shape.

13. A woven wire belt for conveying one or more articles from a first location to a second location spaced from the first location; said woven wire belt comprising:

(a) a plurality of spiral wires, each of said plurality of spiral wires being formed from a round wire having a first diameter which is subsequently shaped to form a shaped spiral wire having a height greater than the first diameter and a width less than said first diameter, each of said plurality of spiral wires having a first sidewall portion and a second sidewall portion, said first sidewall portion and said second sidewall portion being substantially flat;

(b) a plurality of connecting wires for connecting the plurality of spiral wires to form a woven wire belt having a substantially horizontally extending conveying surface, said conveying surface having a plurality of openings; and (c) each of said plurality of connecting wires being fixed to a corresponding one of said plurality of spiral wires forming a plurality of interconnected spiral wire belt segments, each of said plurality of spiral wire belt segments having a plurality of openings.

14. A woven wire belt as recited in claim 13, wherein:

(a) each of said plurality of openings is formed in part by at least one of said first sidewall portion and said second sidewall portion.

15. A woven wire belt as recited in claim 13, wherein:

(a) a first side of each of said plurality of openings is formed by said first sidewall portion and a second side of each of said plurality of openings is formed by said second sidewall portion.

16. A woven wire belt as recited in claim 15, wherein:

(a) said first side of each of said plurality of openings extends substantially parallel to said second side of the corresponding opening.

17. A woven wire belt as recited in claim 13, wherein:

(a) said plurality of spiral wires includes a plurality of left spiral wires and a plurality of right spiral wires.

18. A woven wire belt as recited in claim 17, wherein:

(a) each of said plurality of connecting wires is a straight wire.

19. A woven wire belt as recited in claim 17, wherein:

(a) each of said plurality of connecting wires is a crimped wire.

20. A woven wire belt as recited in claim 13, wherein:

(a) said woven wire belt is one of the following: (i) balanced weave wire belt; (ii) a double weave wire belt; (iii) a rod reinforced weave wire belt; (iv) a chevron weave wire belt; (v) a double balance weave wire belt; and, (vi) a single weave wire belt.

21. A method of forming a woven wire belt for conveying one or more articles from a first location to a second location spaced from the first location; said method including the steps of:

(a) forming a plurality of spiral wires from a round wire having a first diameter such that each of said plurality of spiral wires has a height greater than said first diameter and a width less than said first diameter, each of said plurality of spiral wires having a first sidewall portion and a second sidewall portion, said first sidewall portion and said second sidewall portion being substantially flat;

(b) providing a plurality of connecting wires for connecting the plurality of spiral wires to form a woven wire belt having a substantially horizontally extending conveying surface, said conveying surface having a plurality of openings; and (c) connecting said plurality of connecting wires and said plurality of spiral wires to form a plurality of interconnected spiral wire belt segments, each of said plurality of spiral wire belt segments having a plurality of openings.

22. A woven wire belt for conveying one or more articles from a first location to a second location spaced from the first location; said woven wire belt comprising:

(a) a plurality of spiral wires;

(b) a plurality of connecting wires for connecting the plurality of spiral wires to form a woven wire belt having a conveying surface, each of said plurality of connecting wires extending substantially perpendicular to a direction of travel of the woven wire belt;

(c) each of said plurality of spiral wires having a plurality of upper wire segments and a plurality of lower wire segments, said plurality of upper wire segments are spaced from said plurality of lower wire segments, each of said plurality of upper wire segments are angled in a first direction, each of said plurality of lower wire segments are angled in a second direction wherein the second direction is different from the first direction; and, (d) each of said plurality of spiral wires having a height and a width, said height extending substantially perpendicular to said conveying surface and said width extending substantially parallel to said conveying surface, said height being greater than said width.

* * * * *

UNITED STATES PATENT AND TRADEMARK OFFICE
CERTIFICATE OF CORRECTION

| | | |
|---|---|---|
| PATENT NO. | : 8,973,743 B2 | Page 1 of 1 |
| APPLICATION NO. | : 13/849039 | |
| DATED | : March 10, 2015 | |
| INVENTOR(S) | : Glenn Farrell, Gina Mitchell and Boyd Knepp | |

It is certified that error appears in the above-identified patent and that said Letters Patent is hereby corrected as shown below:

In the claims

Claim 2, column 6, line 3, "wire" now reads -- wires --.
Claim 5, column 6, line 24, "have" now reads -- having --.
Claim 12, column 7, line 16, "have" now reads -- having --.

Signed and Sealed this
Third Day of May, 2016

Michelle K. Lee
*Director of the United States Patent and Trademark Office*